US010322818B2

United States Patent
Lapujade

(10) Patent No.: US 10,322,818 B2
(45) Date of Patent: Jun. 18, 2019

(54) MULTI-BEAM LIGHT

(71) Applicant: Goodrich Lighting Systems, Inc., Oldsmar, FL (US)

(72) Inventor: Philippe Lapujade, Chandler, AZ (US)

(73) Assignee: GOODRICH LIGHTING SYSTEMS, INC., Oldsmar, FL (US)

( * ) Notice: Subject to any disclaimer, the term of this patent is extended or adjusted under 35 U.S.C. 154(b) by 277 days.

(21) Appl. No.: 15/356,345

(22) Filed: Nov. 18, 2016

(65) Prior Publication Data

US 2018/0141677 A1  May 24, 2018

(51) Int. Cl.
| | |
|---|---|
| *F21K 9/68* | (2016.01) |
| *F21K 9/69* | (2016.01) |
| *F21K 9/90* | (2016.01) |
| *F21V 5/04* | (2006.01) |
| *F21V 7/00* | (2006.01) |
| *F21V 7/06* | (2006.01) |
| *B64D 45/08* | (2006.01) |
| *B64D 47/02* | (2006.01) |
| *B64D 47/04* | (2006.01) |
| *F21Y 115/10* | (2016.01) |

(52) U.S. Cl.
CPC ............. *B64D 45/08* (2013.01); *B64D 47/02* (2013.01); *B64D 47/04* (2013.01); *F21K 9/68* (2016.08); *F21K 9/69* (2016.08); *F21K 9/90* (2013.01); *F21V 5/04* (2013.01); *F21V 7/0083* (2013.01); *F21V 7/06* (2013.01); *B64D 2203/00* (2013.01); *F21Y 2115/10* (2016.08)

(58) Field of Classification Search
CPC ........ B64D 45/08; B64D 47/02; B64D 47/04; F21V 7/06; F21V 7/0083; F21V 5/04; F21K 9/90; F21K 9/68; F21K 9/69
See application file for complete search history.

(56) References Cited

U.S. PATENT DOCUMENTS

| | | |
|---|---|---|
| 8,337,059 B2 | 12/2012 | Barnett |
| 2008/0137353 A1 | 6/2008 | Larsen et al. |
| 2016/0076722 A1 | 3/2016 | Hessling von Heimendahl |

FOREIGN PATENT DOCUMENTS

| | | |
|---|---|---|
| EP | 2450279 | 5/2012 |
| EP | 2604521 | 6/2013 |
| EP | 2837566 | 8/2013 |
| EP | 2837566 | 2/2015 |
| EP | 2995501 | 3/2016 |

OTHER PUBLICATIONS

Europran Patent Office, European Search Report dated May 4, 2018 in Application No. 17202565.2-1010.

*Primary Examiner* — Thomas M Sember

(74) *Attorney, Agent, or Firm* — Snell & Wilmer, L.L.P.

(57) ABSTRACT

An LED light system for an aircraft may comprise a first LED lamp having a first LED array. The first LED array may include at least a first LED and a second LED. A first optical element may be configured to direct light emitted from the first LED in a first beam centered around a first angle and to direct light emitted from the second LED in a second beam centered around a second angle. The LED light system may further comprise a second LED lamp having a second LED array. The second LED array may include at least a third LED and a fourth LED. A second optical element may be configured to direct light emitted from the third LED in a third beam centered around the first angle and to direct light emitted from the fourth LED in a fourth beam centered around the second angle.

12 Claims, 7 Drawing Sheets

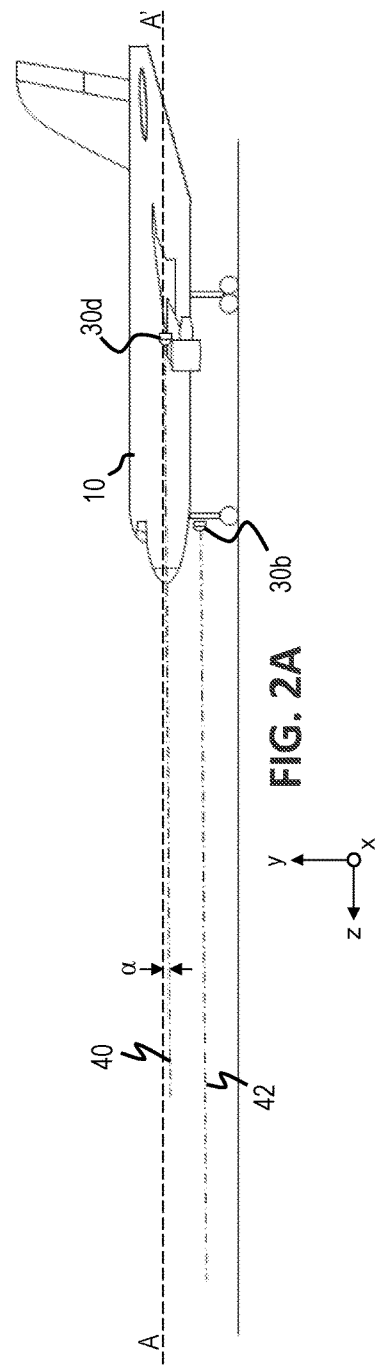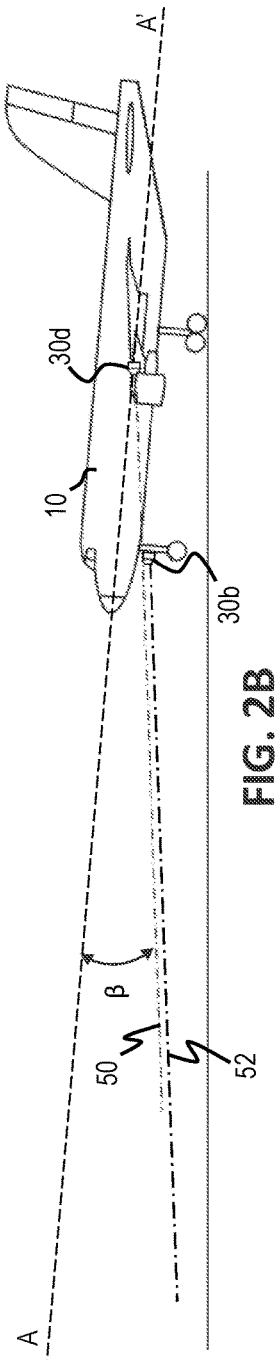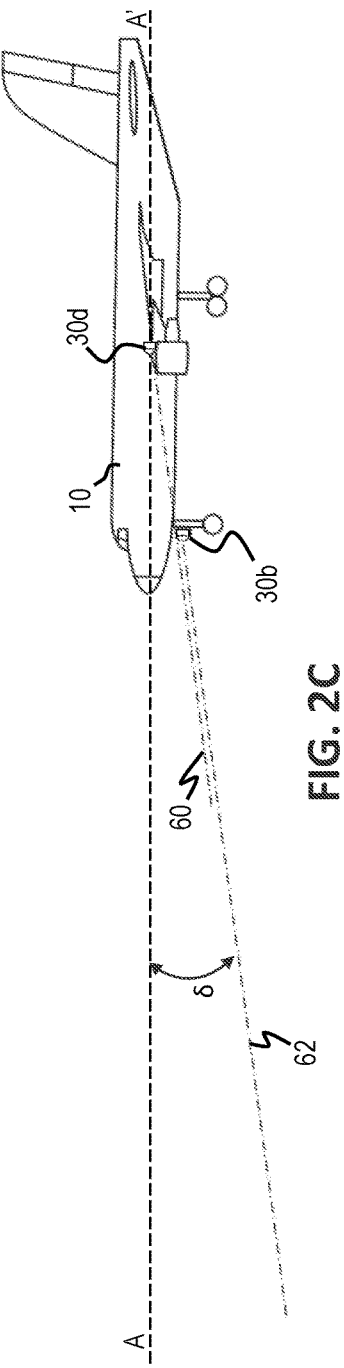

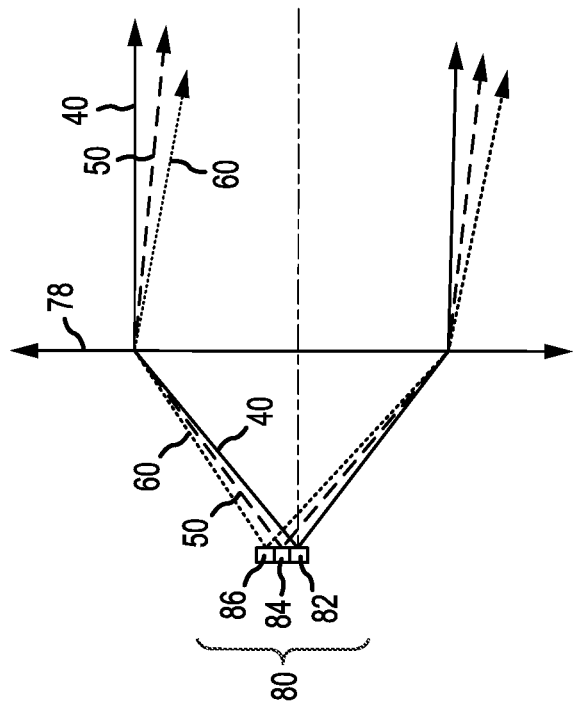
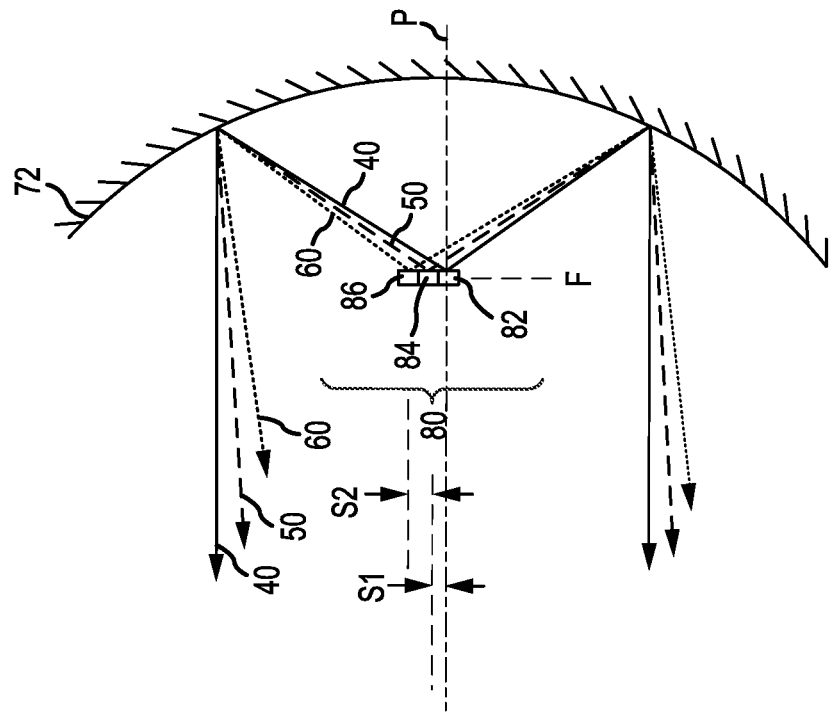

MULTI-BEAM LIGHT

FIELD

The present disclosure relates to light systems and, more specifically, to aircraft external light systems.

BACKGROUND

External aircraft light systems may include various lights used during taxiing, takeoff, approach and landing for the purpose of illuminating an area around the aircraft for visibility for the pilot and aircraft conspicuity. The external light systems may include taxi lights, runway turnoff lights, takeoff lights, landing lights, anti-collision lights, navigation lights, ice detection lights, emergency lights, cargo lights, logo lights and/or novelty lights, among other lights. Taxi lights and runway turnoff lights may be used for aircraft travel while on the ground, for example, when taxiing to and from a gate and a runway. Takeoff lights may be used as the aircraft accelerates and takes off, while landing lights may be used during approach and touchdown.

Commercial aircraft typically employ dedicated landing lights, takeoff lights, taxi lights and runway turnoff lights, which may each use one or more incandescent or halogen lamps. Halogen and incandescent lighting may have a short operational life and are relatively inefficient in terms of lumen output per unit of power consumed. The mounting space on an aircraft occupied by these headlights and the associated wiring is limited such that changing the size, shape or placement of the lamps may be cost prohibitive. Incandescent lamps used for aircraft headlights may not be readily replaceable with light emitting diode (LED) lamps, which have relatively lower light output compared to an incandescent lamp of a similar physical size. Further, increasing the light output of an LED light system by adding more lamps to an aircraft would add undesirable weight to the aircraft.

SUMMARY

A light emitting diode (LED) light system for an aircraft is disclosed herein, in accordance with various embodiments. The LED light system for the aircraft may comprise a first LED lamp having a first LED array. The first LED array may include at least a first LED and a second LED. A first optical element may be configured to direct light emitted from the first LED in a first beam centered around a first angle and to direct light emitted from the second LED in a second beam centered around a second angle. The LED light system may further comprise a second LED lamp having a second LED array. The second LED array may include at least a third LED and a fourth LED. A second optical element may be configured to direct light emitted from the third LED in a third beam centered around the first angle and to direct light emitted from the fourth LED in a fourth beam centered around the second angle.

In various embodiments, the first optical element may comprise at least one of a reflector or a lens. The first LED array includes a fifth LED, the first optical element may be configured to direct light emitted from the fifth LED in a fifth beam centered around a third angle. A distance between the first LED and the second LED may be less than 6 millimeters. The first LED lamp may comprise a parabolic aluminized reflector (PAR) lamp having a diameter between 17.8 centimeters and 22.9 centimeters. The first beam of the first LED lamp and the third beam of the second LED lamp may operate as takeoff lights for the aircraft. The second beam of the first LED lamp and the fourth beam of the second LED lamp may operate as landing lights for the aircraft. The first angle may be less than 1 degree below a horizontal plane of the aircraft. The second angle may be 6 degrees below the horizontal plane of the aircraft.

An LED light system retrofitted for an aircraft having a predetermined mounting area is also provided. The LED light system may comprise a first beam having a first angle output by a first LED lamp and a second LED lamp. A second beam having a second angle may be output by the first LED lamp and the second LED lamp. The first LED lamp may have a diameter based on the predetermined mounting area. The second LED lamp may have a diameter based on the predetermined mounting area.

In various embodiments, the single optical element may comprise at least one of a reflector or a lens. The LED array may include a first LED and a second LED disposed in a fixed position relative to the at least one of the reflector or the lens. The LED lamp may have a diameter based on the preexisting mounting area. The LED lamp may comprise a parabolic aluminized reflector (PAR) lamp having the diameter between 17.8 centimeters and 22.9 centimeters. The LED lamp may operate as a takeoff light for the aircraft and as a landing light for the aircraft.

A method of replacing a light system of an aircraft with an LED light system retrofitted for the aircraft is also provided. The method may comprise the steps of defining a defined lamp diameter based on a preexisting mounting area of the light system, and installing a first LED lamp having the defined lamp diameter in the preexisting mounting area. The first LED lamp may have multiple LEDs that define an LED array. The LED array may be configured such that beams centered around different angles are formed by light emitted from different LEDs in the LED array being directed by a single optical element.

In various embodiments, the first LED array may include at least a first LED and a second LED. The method may further comprise positioning the first LED relative to the first single optical element to direct light emitted from the first LED in a first beam centered around a first angle, and positioning the second LED relative to the first single optical element to direct light emitted from the second LED in a second beam centered around a second angle. The first beam angle may be configured for a takeoff light for the aircraft, and wherein the second beam angle may be configured for a landing light of the aircraft. The first LED array may include a third LED positioned relative to the first single optical element to direct light emitted from the third LED in a third beam centered around a third angle. The first LED lamp may comprise a PAR lamp. The defined lamp diameter may be between 17.8 centimeters and 22.9 centimeters. The method may further comprise installing a second LED lamp having the defined lamp diameter in the preexisting mounting area, the second LED lamp having multiple LEDs that define a second LED array. The second LED array may be configured such that beams centered around different angles are formed by light emitted from different LEDs in the second LED array being directed by a second single optical element.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 2A, 2B and 2C illustrate an aircraft during various stages of operation, in accordance with various embodiments;

FIGS. 4A and 4B illustrate an LED arrangement for an aircraft light system, in accordance with various embodiments.

DETAILED DESCRIPTION

Figure 1:
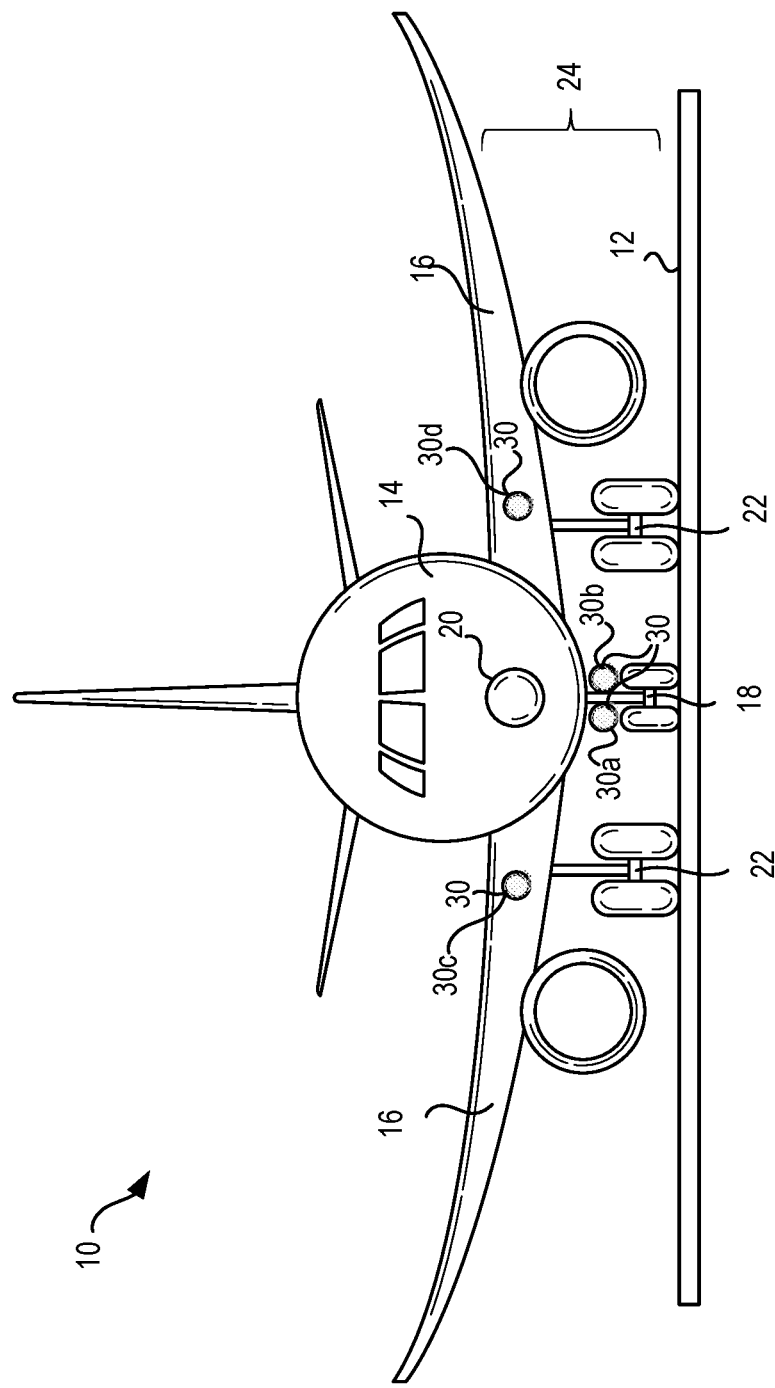
FIG. 1 illustrates an exemplary aircraft, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, optical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

The present disclosure relates to light emitting diode (LED) based light systems for external aircraft lighting and to retrofitting existing external aircraft light assemblies with LED assemblies without significant redesign of the mounting space, wiring or control systems for the lighting. Incandescent or halogen parabolic aluminized reflector (PAR) lamps used for conventional aircraft headlights may be mounted to the wings and/or landing gear of the aircraft. Referring to landing lights and takeoff lights as an example, an aircraft may employ a total of four incandescent PAR lamps for this purpose. Two of the incandescent PAR lamps may operate as landing lights, and the other two of the incandescent PAR lamps may operate as takeoff lights. The present disclosure relates to systems and methods for replacing incandescent PAR lamps with LED systems within the same space on the aircraft previously occupied by incandescent PAR lamps, while still providing with the LED systems sufficient light output (luminous flux) and light intensity (luminous intensity).

While LEDs are more efficient in terms of output per unit power (lumens per watt), LEDs produce heat that limits the efficiency of the LED unless the heat is removed from the system. Thermal management systems for LEDs, such as heat sinks, may conduct heat away from the LEDs to control the operating temperature of LED lamps. The space used to maintain safe and efficient operating temperatures for an LED lamp limits the density of LEDs that can be used in a given space.

Incandescent PAR lamps may include a bulb and a reflector encased in a housing and may be configured in industry standard sizes or diameters. For example, a commercial aircraft may employ a quantity of four 500 watt (or greater) incandescent PAR64 lamps, i.e., two incandescent PAR64 lamps as landing lights and two incandescent PAR64 lamps as takeoff lights. The numeral "64" in "PAR64" refers to a diameter of the lamp measured in ⅛ inch increments, e.g., a PAR64 may have a diameter of 64 times ⅛ inch, or approximately 8 inches (20.3 centimeters (cm)). An LED PAR lamp having the same or similar diameter as an incandescent PAR lamp may produce a lower light output. A single incandescent PAR64 lamp may produce between 15,000 lumens and 20,000 lumens. An LED PAR64 lamp may produce less than 10,000 lumens. Thus, simply replacing an incandescent PAR64 with an LED PAR64 may not produce sufficient light output to meet SAE ARP 693 recommendations (SAE Aircraft Recommended Practice 693 includes recommended standards for headlights on an aircraft) and be acceptable to most pilots. The LED light systems disclosed herein provide, in various embodiments, a solution for retrofitting an aircraft previously configured for incandescent PAR lamps. The disclosed LED systems, in various embodiments, provide LED lamp assemblies that fit within existing mounting space on the aircraft and provide sufficient light output, which is comparable to the incandescent lamps being replaced.

With reference to FIG. 1, an aircraft 10 on runway 12 is shown in a front view, in accordance with various embodiments. Aircraft 10 may comprise a fuselage 14, which may be coupled to and/or comprise a pair of wings 16. Aircraft 10 may comprise a nose landing gear 18 located under the nose 20 of aircraft, and may further comprise a right and left landing gear 22. A light system 24 of aircraft 10 may comprise a plurality of LED lamps 30, which may comprise exterior or external aircraft lights that illuminate areas around the aircraft 10 while the aircraft 10 is on the ground or in flight. Light system 24 may include LED lamps 30a, 30b, 30c, 30d, which may collectively be referred to as LED lamps 30. In various embodiments, LED lamp 30a and LED lamp 30b may both be mounted to nose landing gear 18. LED lamp 30c and LED lamp 30d may each be mounted to a wing 16, such as on the wing roots or on the front edges of the wings 16. LED lamps 30 may operate as a takeoff lights, landing lights, taxi lights and/or a runway turnoff light. As illustrated in FIG. 1, for example, LED lamps 30 are multi-beam light assemblies configured to operate as takeoff lights and landing lights.

Referring to FIGS. 2A, 2B and 2C, an aircraft during various stages of operation is shown, in accordance with various embodiments. The direction that nose 20 of aircraft 10 is pointing may be referred to as a heading or pointing direction. Nose 20 of aircraft 10 may be pointed along a central longitudinal axis A-A' of aircraft 10, for example, in a direction forward of fuselage 14. Central longitudinal axis A-A' is oriented along the z axis on the provided xyz axes, which may defined be relative to aircraft 10, wherein aircraft 10 points in the positive z direction. The terms "horizontal" and "vertical" may be relative to the horizontal plane of aircraft 10, i.e., the xz plane, rather than relative to the ground. A measurement point displaced in the positive y direction from a given reference point may be considered "above" or on "top" of the given reference point. A measurement point displaced in the negative y direction from the given reference point may be considered "below" or on "bottom" of the given reference point. In that regard, the terms "top" and "bottom" may refer to relative positions along the y axis.

LED lamps 30 may be configured to operate in a plurality of operating modes. Three operating modes of aircraft 10 are illustrated by FIGS. 2A, 2B and 2C including takeoff, touch down, and a landing approach. FIG. 2A illustrates the aircraft in ground roll where the aircraft 10 accelerates prior to takeoff. LED lamp 30*d* may be configured to provide a first beam 40. LED lamp 30*d* may be configured to provide a first beam 42. First beams 40, 42 may be useful when aircraft 10 is taking off and/or landing. First beams 40, 42 may be aimed generally forward of nose 20 with a vertical beam distribution centered at a beam center. A beam center of first beam 40 of LED lamp 30*d* is shown as the line of first beam 40, and a beam center of first beam 42 of LED lamp 30*b* is shown as the line of first beam 42.

In various embodiments, first beams 40, 42 may be aimed about −0.5 degrees) (°) relative to the central longitudinal axis A-A' of the aircraft 10, wherein "about" in this context only means +/−1°. Stated differently, a beam center of each of the first beams 40, 42 may be at first angle α ("alpha") of 0.5° below the aircraft horizontal z axis. Similarly, LED lamp 30*a* and LED lamp 30*c* (from FIG. 1) mounted to the right side of aircraft 10 may each also output a first beam centered at the first angle α of about −0.5°, wherein "about" in this context only means +/−1°. First beams 40, 42 also have a horizontal beam distribution in the xz plane, with the horizontal beam distribution centered at the beam center. In various embodiments, a horizontal beam distribution angle of first beams 40, 42 may be about 3° centered along the central longitudinal axis A-A', or otherwise centered along an aiming direction, wherein "about" in this context only means +/−1°.

FIG. 2B illustrates the aircraft in approach where the aircraft 10 touches the ground upon landing. LED lamp 30*d* may be configured to provide a second beam 50. LED lamp 30*d* may be configured to provide a second beam 52. Second beams 50, 52 may be useful while aircraft 10 is touching down on the ground upon landing. Second beams 50, 52 may be aimed generally forward of nose 20 with a vertical beam distribution centered at a beam center. A beam center of second beam 50 of LED lamp 30*d* is shown as the line of second beam 50, and a beam center of second beam 52 of LED lamp 30*b* is shown as the line of second beam 52.

In various embodiments, second beams 50, 52 may be aimed about −6° relative to the central longitudinal axis A-A' of the aircraft 10, wherein "about" in this context only means +/−2°. A beam center of each of the second beams 50, 52 may be at second angle β ("beta") of 6° below the aircraft horizontal z axis. Similarly, LED lamp 30*a* and LED lamp 30*c* (from FIG. 1) mounted to the right side of aircraft 10 may each also output a second beam centered at the second angle β of about −6°, wherein "about" in this context only means +/−2°. Second beams 50, 52 also have a horizontal beam distribution in the xz plane, with the horizontal beam distribution centered at the beam center.

FIG. 2C illustrates the aircraft in approach where the aircraft 10 descends prior to landing on the ground. LED lamps 30*d* may be configured to provide a third beam 60. LED lamps 30*d* may be configured to provide a third beam 60. Third beams 60, 62 may be useful while aircraft 10 is approaching the ground for landing. Third beams 60, 62 may be aimed generally forward of nose 20 with a vertical beam distribution with a vertical beam distribution centered at a beam center. A beam center of third beam 60 of LED lamp 30*d* is shown as the line of third beam 60, and a beam center of third beam 62 of LED lamp 30*b* is shown as the line of third beam 62.

In various embodiments, third beams 60, 62 may be aimed about −12° relative to the central longitudinal axis A-A' of the aircraft 10, wherein "about" in this context only means +/−3°. A beam center of each of the third beams 60, 62 may be at a third angle δ ("delta") of 12° below the aircraft horizontal z axis. Similarly, LED lamp 30*a* and LED lamp 30*c* (from FIG. 1) mounted to the right side of aircraft 10 may each also output a third beam centered at the third angle δ of about −12°, wherein "about" in this context only means +/−3°. Third beams 60, 62 also have a horizontal beam distribution in the xz plane, with the horizontal beam distribution centered at the beam center.

Thus, LED lamps 30*a*, 30*b*, 30*c*, 30*d* may each be multi-beam lamps configured to output a first beam, such as first beam 40 aimed at −0.5°. A combined light output of the first beams of LED lamps 30*a*, 30*b*, 30*c*, 30*d* may produce at least as much luminous flux as two incandescent lamps of comparable diameter. In that regard, LED lamps 30*a*, 30*b*, 30*c*, 30*d* may operate as takeoff lights. Further, LED lamps 30*a*, 30*b*, 30*c*, 30*d* may each be configured to output a second beam, such as second beam 50 aimed at −6°, and each may further be configured to output a third beam, such as third beam 60 aimed at −12°. Again, a combined light output of the second beams or the third beams of LED lamps 30*a*, 30*b*, 30*c*, 30*d* may produce at least as much luminous flux as two incandescent lamps of comparable diameter. In that regard, LED lamps 30*a*, 30*b*, 30*c*, 30*d* may also operate as landing lights. Where a conventional aircraft employed two incandescent lamps as landing lights and two incandescent lamps as takeoff lights, the present disclosure provides a light system 24 having four LED lamps with all four LED lamps operating as both landing lights and takeoff lights. Accordingly, the light system 24 (FIG. 1) operates as an LED light system to replace incandescent landing lights and takeoff lights by providing multi-directional LED lamps.

Although discussed and illustrated as a four lamp example using PAR64 lamps for takeoff and landing lights, it will be understood that the present disclosure is applicable to other quantities of lamps mounted to an aircraft and to additional sizes of lamps as well as other aircraft lighting systems, such as taxi lights, runway turnoff lights and other lights. By example, two incandescent lamps each having different beam angles may be replaced with two multi-beam LED, wherein each multi-beam LED lamp outputs at least two beam angles.

Figure 3:
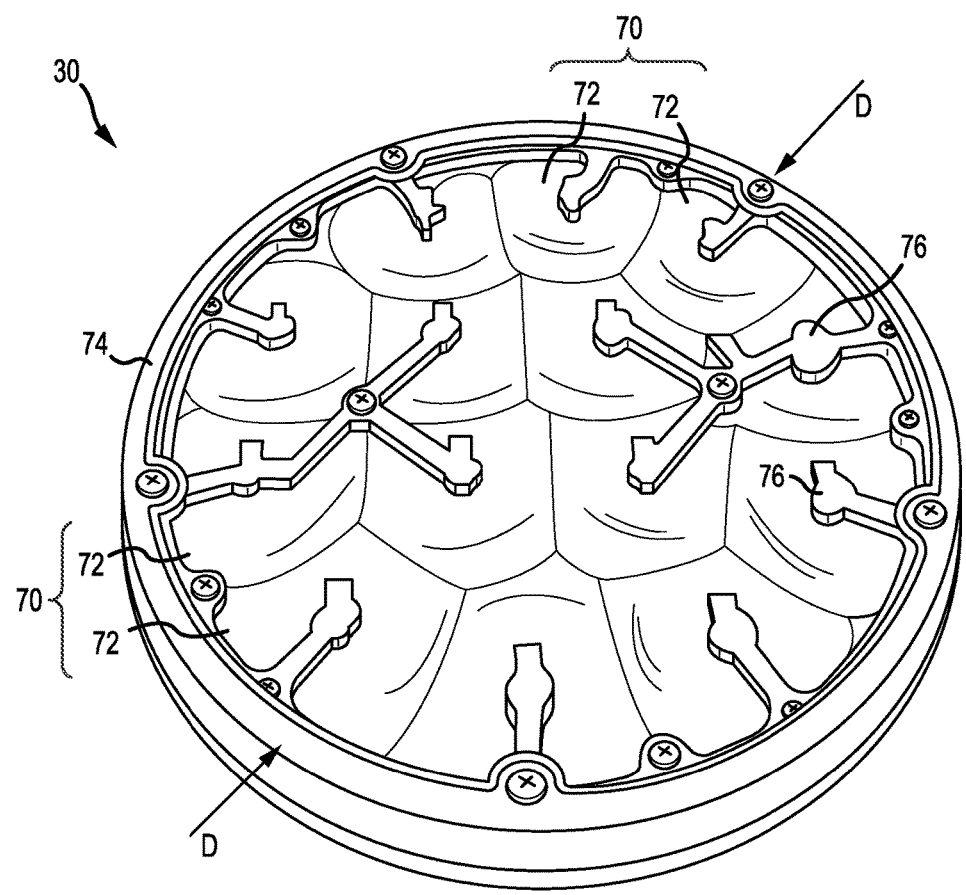
FIG. 3 illustrates an LED lamp for an aircraft light system, in accordance with various embodiments.

Referring to FIG. 3, an arrangement for an LED lamp for an aircraft light system is shown, in accordance with various embodiments. In various embodiments, each of LED lamps 30a, 30b, 30c, 30d, as discussed with respect to FIGS. 1, 2A, 2B and 2C, may be configured similarly to the LED lamp 30 shown in FIG. 3. Each LED lamp 30 of light system 24 may include one or more optical elements 70, which may be reflectors 72 and/or lenses. The optical elements 70 of LED lamp 30 are illustrated in FIG. 3 as reflectors 72. A reflector 72 may be substantially parabolic. LED lamp 30 is illustrated in FIG. 3 as an LED PAR64 having a quantity of fourteen of reflectors 72 arranged in a two dimensional array within a housing 74 of LED lamp 30. LED lamp 30 may have various quantities of reflectors 72. A quantity of reflectors 72 used in LED lamp 64 may be determined at least in part by the size of housing 74. In retrofitting LED lamp 30 to an aircraft configured with a predetermined mounting area, a size and/or diameter D of LED lamp 30 may be configured to be accommodated within the predetermined mounting space, or to fit within the predetermined mounting area. In various embodiments, LED lamp 30 and/or housing 74 may have a diameter D between 3 inches (7.6 cm) and 12 inches (30.5 cm), or between 5 inches (12.7 cm) and 12 inches (30.5 cm), or between 6 inches (15.2 cm) and 10 inches (25.4 cm), or more specifically between 7 inches (17.8 cm) and 9 inches (22.9 cm), and nominally 8 inches (20.3 cm).

LED lamp 30 may further include a plurality of light sources 76 arranged with an optical element 70 positioned to aim one or more light beams from light sources 76. Light sources 76 may be groups of LEDs or an array of LEDs (see FIGS. 4A and 4B). An optical element 70 may be associated with a light source 76 to form a portion of the LED lamp 30. A plurality of optical elements, such as reflectors 72, may be positioned with one or more light sources 76, to provide the multi-beam light output of LED lamp 30.

Referring to FIGS. 4A and 4B, an optical element and LED arrangement for an aircraft light system is shown, in accordance with various embodiments. An optical element 70 for an LED lamp 30 (from FIG. 3) is illustrated as a reflector 72 in FIG. 4A. Light source 76 (from FIG. 3) is illustrated as an LED array 80 comprising a plurality of individual LEDs. An LED array 80 may include a first LED 82, a second LED 84 and a third LED 86. LED array 80 may be a linear array, a two dimensional array or other suitable arrangement. The optical element 70 for an LED lamp 30 (from FIG. 3) is illustrated as a lens 78 in FIG. 4B. The lens 78 is illustrated simply as a line, however, lens 78 may have at least one curved surface, and either or both surfaces of lens 78 may be convex or concave.

Each LED lamp 30 may include one or more LED arrays 80. The LED arrays 80 may each include a first LED 82 and second LED 84. An optical element 70 may be configured to direct light emitted from first LED 82 in a first beam 40 centered around a first angle α and to direct light emitted from the second LED 84 in a second beam 50 centered around a second angle β. Each LED array 80 may further include a third LED 86. Optical element 70 may be configured to direct light emitted from third LED 86 in a third beam 60 centered around a third angle δ. Optical element 70 may comprise at least one of a reflector 72 or a lens 78. The optical element for LED array 80 will be discussed in terms of reflector 72, but also applies to lens 78.

Each LED 82, 84, 86 of LED array 80 may have a fixed position with respect to reflector 72. The individual LEDs may be separated by a distance between adjacent LEDs, and each LED 82, 84, 86 may be positioned at selected distance from a focal point of reflector 72, wherein the focal point of reflector 72 is illustrated at a point along a reflector axis P at the focal length F from a surface of reflector 72. For example, first LED 82 may be placed within 1 millimeter (mm) of the focal point of reflector 72. Second LED 84 may be separated from first LED 82 a distance S1, and similarly, may be offset from reflector axis P by a distance S1. A distance S1 between first LED 82 and second LED 84 may be less than 6 mm, or less than 5 mm, or less than 4 mm, or less than 3 mm, or less than 2 mm. Third LED 86 may be separated from second LED 84 by a distance S2. A distance S2 between second LED 84 and third LED 86 may be less than 6 mm, or less than 5 mm, or less than 4 mm, or less than 3 mm, or less than 2 mm. The distances S1, S2 of separation between first LED 82 and second LED 84, and second LED 84 and third LED 86, respectively, may be selected based on the focal length F and diameter of reflector 72 and further based on the number of reflectors 72 in LED lamp 30 (from FIG. 3) and the light output of each LED 82, 84, 86. A reflector 72 may be modified to fit into an array or lamp, for example, by truncating the reflector 72. The diameter of reflector 72 may refer to the baseline diameter of a reflector 72 prior to truncating the reflector 72 and fitting the reflector into LED lamp 30. Thus, the reflector diameter may indicate the relative shape and/or curvature of the reflector 72, regardless of truncation. Thus, a reflector 72 may be a portion of a reflector, and a reflector diameter may be relative size and shape of the reflector or a portion of the reflector.

TABLE 1 shows arrangements of LEDs and reflectors that can be placed into an LED PAR64 lamp to achieve 5,000 lumens of light output at various beam angles, in accordance with various embodiments.

TABLE 1

| | | Focal Length (mm) | | | | |
|---|---|---|---|---|---|---|
| Beam angle (degrees) | | 10 | 15 | 20 | 30 | 50 |
| Distance between LEDs (mm) | 1 | (6) | (4) | (3) | (2) | (1) |
| | 2 | 11 | (8) | (5) | (4) | (2) |
| | 3 | 17 | 11 | 9 | 6 | (3) |
| | 4 | 22 | 15 | 11 | 7 | (5) |
| | 5 | 27 | 18 | 14 | 9 | 6 |
| | 6 | 31 | 22 | 17 | 11 | 7 |
| Reflector Diameter (mm) | | 40 | 60 | 80 | 120 | 200 |
| Quantity of Reflectors | | 18 | 14 | 12 | 10 | 4 |
| Luminous flux per LED (lumens) | | 278 | 357 | 417 | 500 | 1250 |

TABLE 1 further shows various sizes and quantities of optical elements, such as reflectors 72 from FIG. 3, and various positions of LEDs within an LED array, such as LEDs 82, 84, 86 from FIG. 4A, for producing various beam angles for a multi-beam LED lamp, such as LED lamp 30.

Referring to FIGS. 2B and 4A and to TABLE 1, a desired beam angle of aircraft headlights during touchdown may be 6° as shown by second angle β of second beams 50, 52 in FIG. 2B. Further, a desired light output during touchdown may be provided by a combined light output from the second beams 50 (see FIG. 4A) of multiple 5,000 lumen LED PAR64 lamps. As discussed above, retrofitting an aircraft previously configured for incandescent PAR64 lamps involves fitting the LED lamps within a pre-determined mounting area. Thus, diameter and quantity of reflectors for the LED lamp were selected to have a total diameter that is similar to or less than a diameter of an incandescent PAR64 lamp.

As shown in TABLE 1 by example, an LED lamp 30 that may produce 5,000 lumens and a beam angle of 6° is configured with four reflectors each having a focal length of 50 mm and a reflector diameter of up to 200 mm, and with four LEDs spaced at a distance of 5 mm from each reflector axis, with each LED having a luminous flux output of 1,250 lumens.

As shown in TABLE 1 by further example, an LED lamp 30 that may produce 5,000 lumens and a beam angle of 6° is configured with ten reflectors each having a focal length of 30 mm and a reflector diameter of up to 120 mm, and with ten LEDs spaced at a distance of 3 mm from each reflector axis, with each LED having a luminous flux output of 500 lumens.

Relating this example to FIGS. 2B, 3 and 4A, an LED lamp 30 may have ten reflectors 72, in accordance with various embodiments. Each of the ten reflectors 72 may have at least one LED array 80 associated with a reflector 72, and thus, LED lamp 30 may have at least ten LED arrays 80. Each of the ten LED array 80 may include at least a second LED 84 spaced at a distance S1 of 3 mm from reflector axis P. Light beams from each of the second LEDs 84 are reflected by the associated reflector 72 to produce a second beam 50. Each of the second LEDs 84 may have an output of 500 lumens, such that the combined output of ten of the second LEDs 84 aimed at a beam angle of 6° provides an output by the LED lamp 30 of 5,000 lumens at a beam angle of 6°. LED lamp 30 may further be part of a light system 24 (FIG. 1) that includes a plurality of LED lamps 30 that also produce a second beam 50 at a beam angle of 6°. Light system 24 including one or more LED lamps 30 retrofitted onto aircraft 10 to provide a multi-beam LED light system, thereby replacing a non-LED landing lights and takeoff lights with LED landing lights and takeoff lights.

Figure 5A:
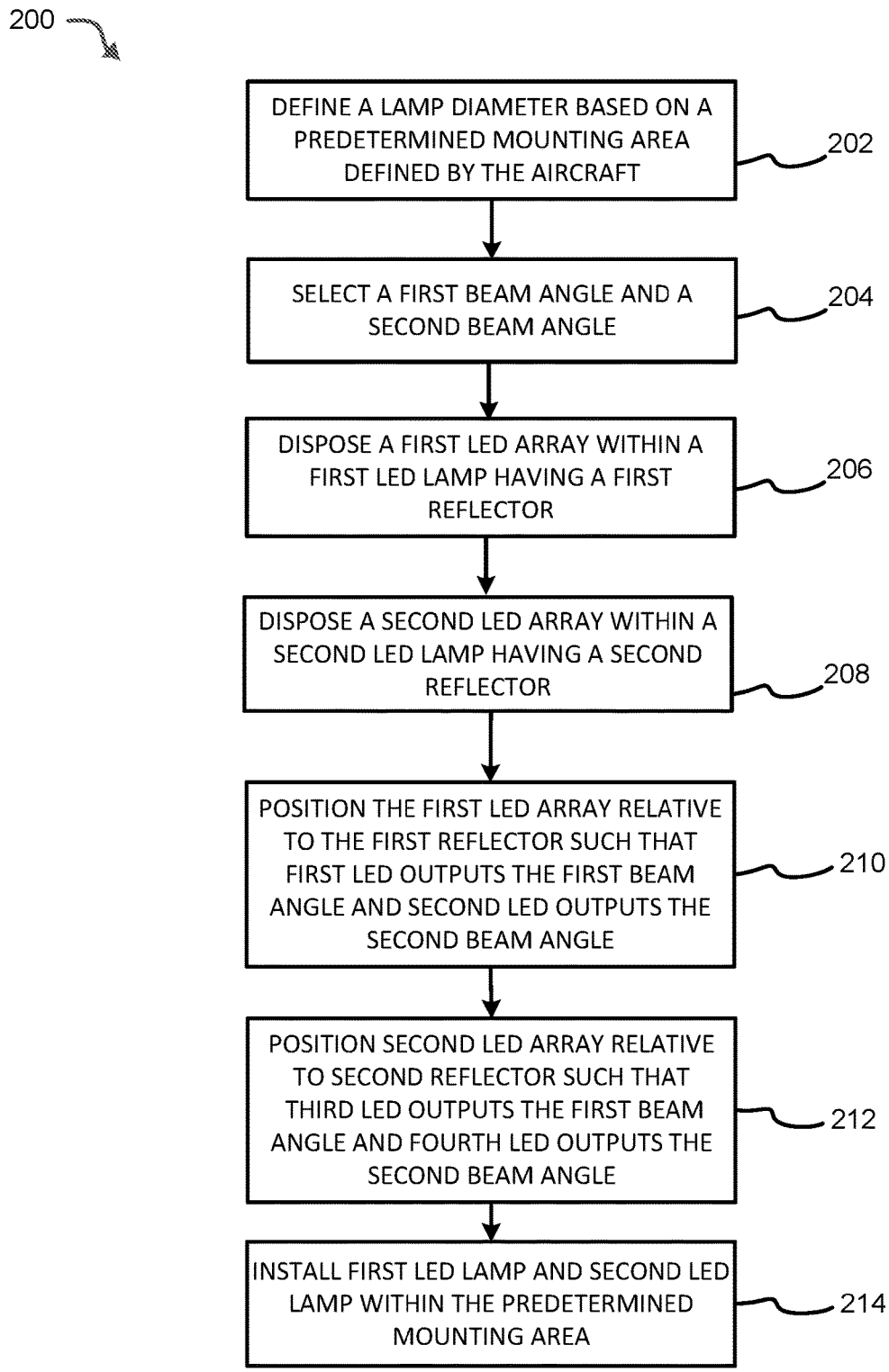
FIGS. 5A, 5B and 5C illustrate a methods of retrofitting a light system of an aircraft an aircraft, in accordance with various embodiments.
Figure 5B:
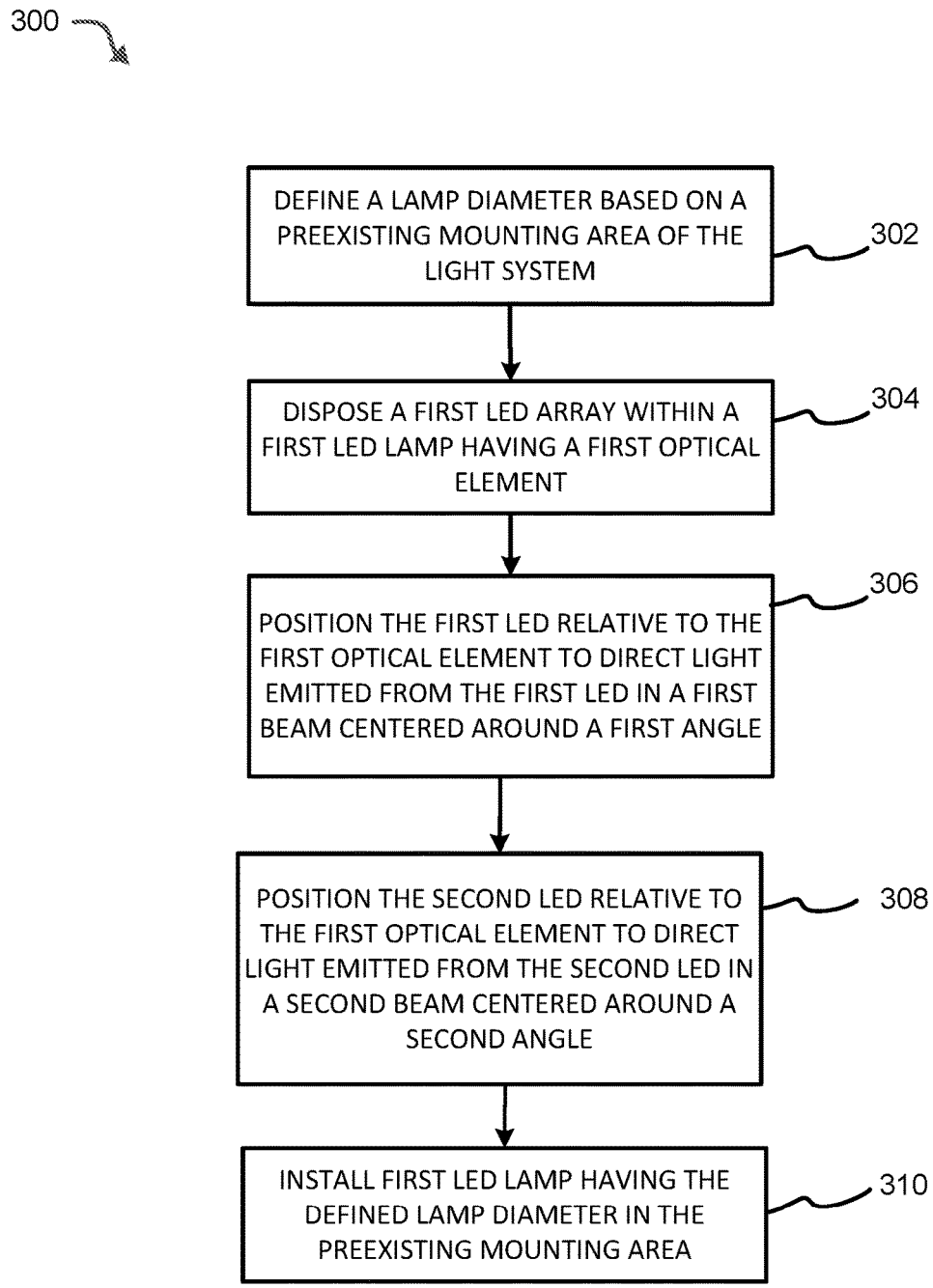
Figure 5C:
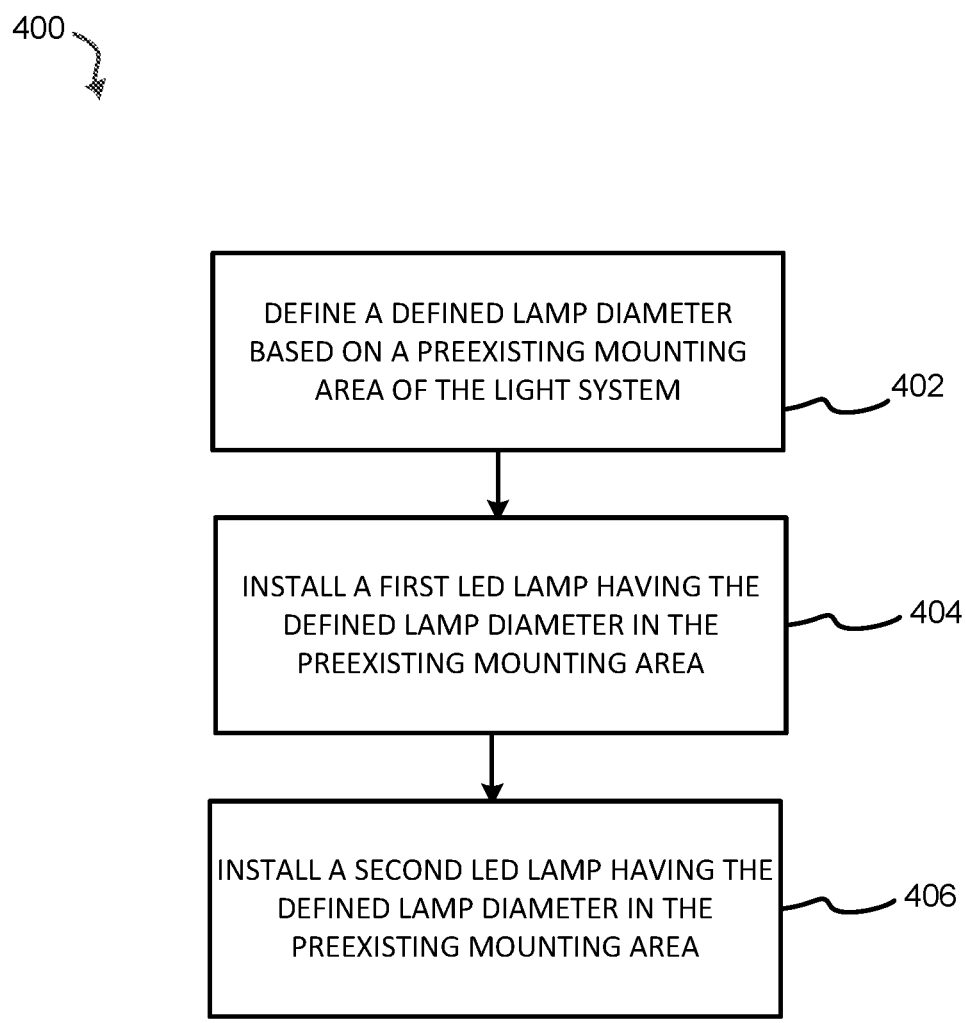

With reference to FIGS. 5A, 5B and 5C, methods of retrofitting the light system of the aircraft are shown, in accordance with various embodiments. With reference to FIG. 5A, a method 200 of manufacturing an LED light system retrofitted for an aircraft is shown, in accordance with various embodiments. An aircraft 10 may have mechanical and electrical fittings configured for one or more incandescent PAR lamps. The incandescent PAR lamp base and housing may define a size and shape of the socket and available mounting area on the aircraft 10. Method 200 may comprise the steps of defining a lamp diameter based on a predetermined mounting area defined by the aircraft (step 202), selecting a first beam angle and a second beam angle (step 204), and disposing a first LED array within a first LED lamp having a first reflector (step 206). The first LED lamp 30 may have the defined lamp diameter. The first LED array, such as LED array 80, may include a first LED 82 and a second LED 84. The first LED array may include a fifth LED (similar to third LED 86). The first optical element 70 may be configured to direct light emitted from the fifth LED in a fifth beam (similar to third beams 60, 62) centered around a third angle.

Method 200 may further comprise the step of disposing a second LED array within a second LED lamp having a second reflector (step 208). The second LED lamp 30 may have the defined lamp diameter. The second LED array, such as LED array 80, may include a third LED (similar to first LED 82) and a fourth LED (similar to second LED 84). Method 200 may further comprise the steps of positioning the first LED array relative to the first reflector such that the first LED outputs the first beam angle and the second LED outputs the second beam angle (step 210), positioning the second LED array relative to the second reflector such that the third LED outputs the first beam angle and the fourth LED outputs the second beam angle (step 212), and installing the first LED lamp and the second LED lamp within the predetermined mounting area (step 214).

With reference to FIG. 5B, a method 300 for replacing a light system of an aircraft with an LED light system retrofitted for the aircraft is shown, in accordance with various embodiments. Method 300 may comprise the steps of defining a lamp diameter based on a preexisting mounting area of the light system (step 302), disposing a first LED array within a first LED lamp having a first optical element (step 304). The first LED array may include at least a first LED 82 and a second LED 84. Method 300 may further comprise the steps of positioning the first LED relative to the first optical element to direct light emitted from the first LED in a first beam centered around a first angle (step 306), positioning the second LED relative to the first optical element to direct light emitted from the second LED in a second beam centered around a second angle (step 308), and installing a first LED lamp having the defined lamp diameter in the preexisting mounting area (step 310).

In various embodiments, the first angle $\alpha$ may be configured for a takeoff light for the aircraft, and the second angle $\beta$ may be configured for a landing light of the aircraft. The first LED array, such as LED array 80, may further include a third LED 86 positioned relative to the first optical element 70 to direct light emitted from the third LED 86 in a third beam centered around a third angle $\delta$.

With reference to FIG. 5C, a method 400 of replacing a light system of an aircraft with an LED light system retrofitted for the aircraft is shown, in accordance with various embodiments. Method 400 may comprise the steps of defining a defined lamp diameter based on a preexisting mounting area of the light system (step 402), and installing a first LED lamp having the defined lamp diameter in the preexisting mounting area (step 404).

Method 400 may further include installing a second LED lamp having the defined lamp diameter in the preexisting mounting area (step 406). The second LED lamp 30 may have multiple LEDs that define a second LED array 80. The second LED array 80 may be configured such that beams centered around different angles are formed by light emitted from different LEDs in the second LED array 80 being directed by a second single optical element 70. Thus, methods of retrofitting the light system of the aircraft are disclosed.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A light emitting diode (LED) light system retrofitted for an aircraft having a preexisting mounting area, comprising:
    an LED lamp sized and configured to fit within the preexisting mounting area of the aircraft, the LED lamp having multiple light emitting diodes (LEDs) that define an LED array, the LED array being configured such that beams centered around different angles are formed by light emitted from different LEDs in the LED array being directed by a single optical element, wherein the LED array comprises a first LED aligned with an axis of the single optical element, a second LED positioned above the first LED, and a third LED positioned above the second LED.

2. The LED light system of claim 1, wherein the single optical element comprises at least one of a reflector or a lens.

3. The LED light system of claim 2, wherein the first LED and the second LED are disposed in a fixed position relative to the at least one of the reflector or the lens.

4. The LED light system of claim 2, wherein the LED lamp comprises a parabolic aluminized reflector (PAR) lamp having the diameter between 17.8 centimeters and 22.9 centimeters.

5. The LED light system of claim 1, wherein the LED lamp has a diameter based on the preexisting mounting area.

6. The LED light system of claim 1, wherein the LED lamp operates as a takeoff light for the aircraft and as a landing light for the aircraft.

7. A method of replacing a light system of an aircraft with a light emitting diode (LED) light system retrofitted for the aircraft, comprising:
    defining a defined lamp diameter based on a preexisting mounting area of the light system; and
    installing a first LED lamp having the defined lamp diameter in the preexisting mounting area, the first LED lamp having multiple light emitting diodes (LEDs) that define a first LED array, the first LED array being configured such that beams centered around different angles are formed by light emitted from different LEDs in the first LED array being directed by a first single optical element, wherein the first LED array comprises a first LED aligned with an axis of the first single optical element, a second LED positioned above the first LED, and a third LED positioned above the second LED.

8. The method of claim 7, further comprising:
    positioning the first LED relative to the first single optical element to direct light emitted from the first LED in a first beam centered around a first angle; and
    positioning the second LED relative to the first single optical element to direct light emitted from the second LED in a second beam centered around a second angle.

9. The method of claim 8, wherein the first angle is configured for a takeoff light for the aircraft, and wherein the second angle is configured for a landing light of the aircraft.

10. The method of claim 9, wherein the third LED is positioned relative to the first single optical element to direct light emitted from the third LED in a third beam centered around a third angle.

11. The method of claim 7, wherein the first LED lamp comprises a parabolic aluminized reflector (PAR) lamp, and wherein the defined lamp diameter is between 17.8 centimeters and 22.9 centimeters.

12. The method of claim 7, further comprising installing a second LED lamp having the defined lamp diameter in the preexisting mounting area, the second LED lamp having multiple LEDs that define a second LED array, the second LED array being configured such that beams centered around different angles are formed by light emitted from different LEDs in the second LED array being directed by a second single optical element.

* * * * *